(12) United States Patent
Yang

(10) Patent No.: US 8,570,734 B2
(45) Date of Patent: Oct. 29, 2013

(54) SERVER ASSEMBLY

(75) Inventor: Feng-Chi Yang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 221 days.

(21) Appl. No.: 13/283,595

(22) Filed: Oct. 28, 2011

(65) Prior Publication Data

US 2013/0088823 A1    Apr. 11, 2013

(30) Foreign Application Priority Data

Oct. 11, 2011    (CN) .......................... 2011 1 0306252

(51) Int. Cl.
*H05K 7/20*    (2006.01)

(52) U.S. Cl.
USPC ......... 361/679.5; 361/695; 454/184; 174/520

(58) Field of Classification Search
USPC .................. 361/676–678, 679.46–679.54, 361/688–701, 752, 760, 831
See application file for complete search history.

(56) References Cited

U.S. PATENT DOCUMENTS

| | | | |
|---|---|---|---|
| 7,911,778 B2 * | 3/2011 | Merrow | 361/679.37 |
| 7,920,380 B2 * | 4/2011 | Merrow et al. | 361/695 |
| 7,940,529 B2 * | 5/2011 | Merrow et al. | 361/728 |
| 7,945,424 B2 * | 5/2011 | Garcia et al. | 702/183 |
| 8,095,234 B2 * | 1/2012 | Polyakov et al. | 700/214 |
| 8,160,739 B2 * | 4/2012 | Toscano et al. | 700/214 |
| 8,305,751 B2 * | 11/2012 | Merrow | 361/679.37 |
| 8,467,180 B2 * | 6/2013 | Merrow et al. | 361/679.34 |

* cited by examiner

*Primary Examiner* — Courtney Smith
(74) *Attorney, Agent, or Firm* — Altis & Wispro Law Group, Inc.

(57) ABSTRACT

A server assembly includes a server, a number of first air ducts, and a number of second air ducts. A number of intakes and outlets are defined in a top of a chassis of the server. Each of the first and second ducts includes a hollow main body, and a connecting portion extending from a bottom of the main body. A first opening is defined in an end of the main body of each of the first and second ducts. A second opening is defined in each of the connecting portions of each of the first and second ducts. Outside air flows through the first air ducts, thereby flowing into the chassis to be heated, thereby cooling the server. The heated air is expelled out of the chassis through the second air ducts.

8 Claims, 3 Drawing Sheets

SERVER ASSEMBLY

BACKGROUND

1. Technical Field

The present disclosure relates to a server assembly with a heat dissipation apparatus.

2. Description of Related Art

A server chassis generally defines a plurality of vents in front and rear ends. Air outside flows into the server chassis through the vents in the front end to cool electronic components inside the server chassis. Heated air is expelled out of the server chassis through the vents in the rear end. However, the front and rear ends are often too small to provide enough space to arrange the vents for maximum benefit. Therefore, it is hard to satisfy the increasing cooling requirements.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
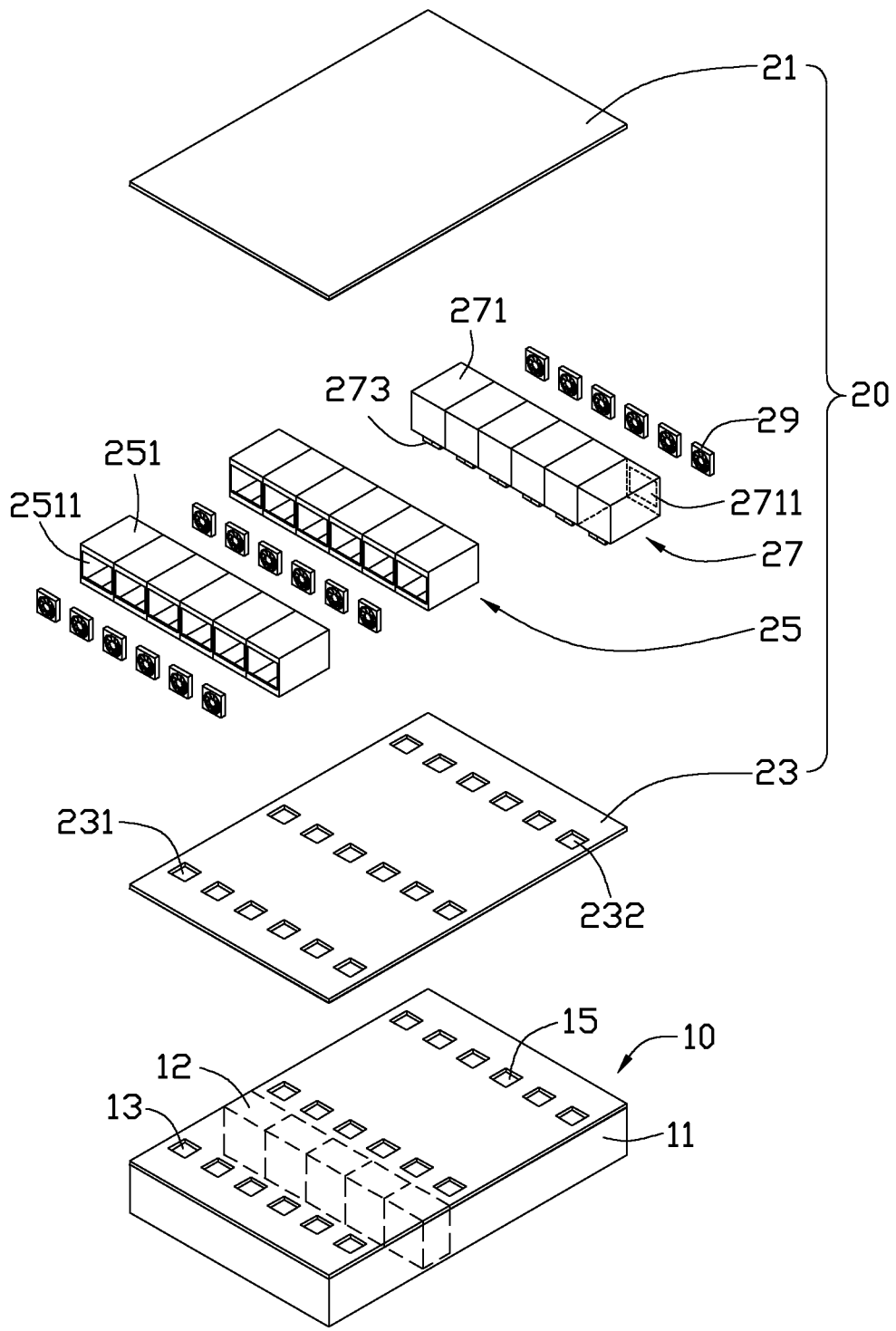
FIGS. 1 and 2 are exploded, isometric views of an exemplary embodiment of a server assembly, shown from different perspectives.
Figure 2:
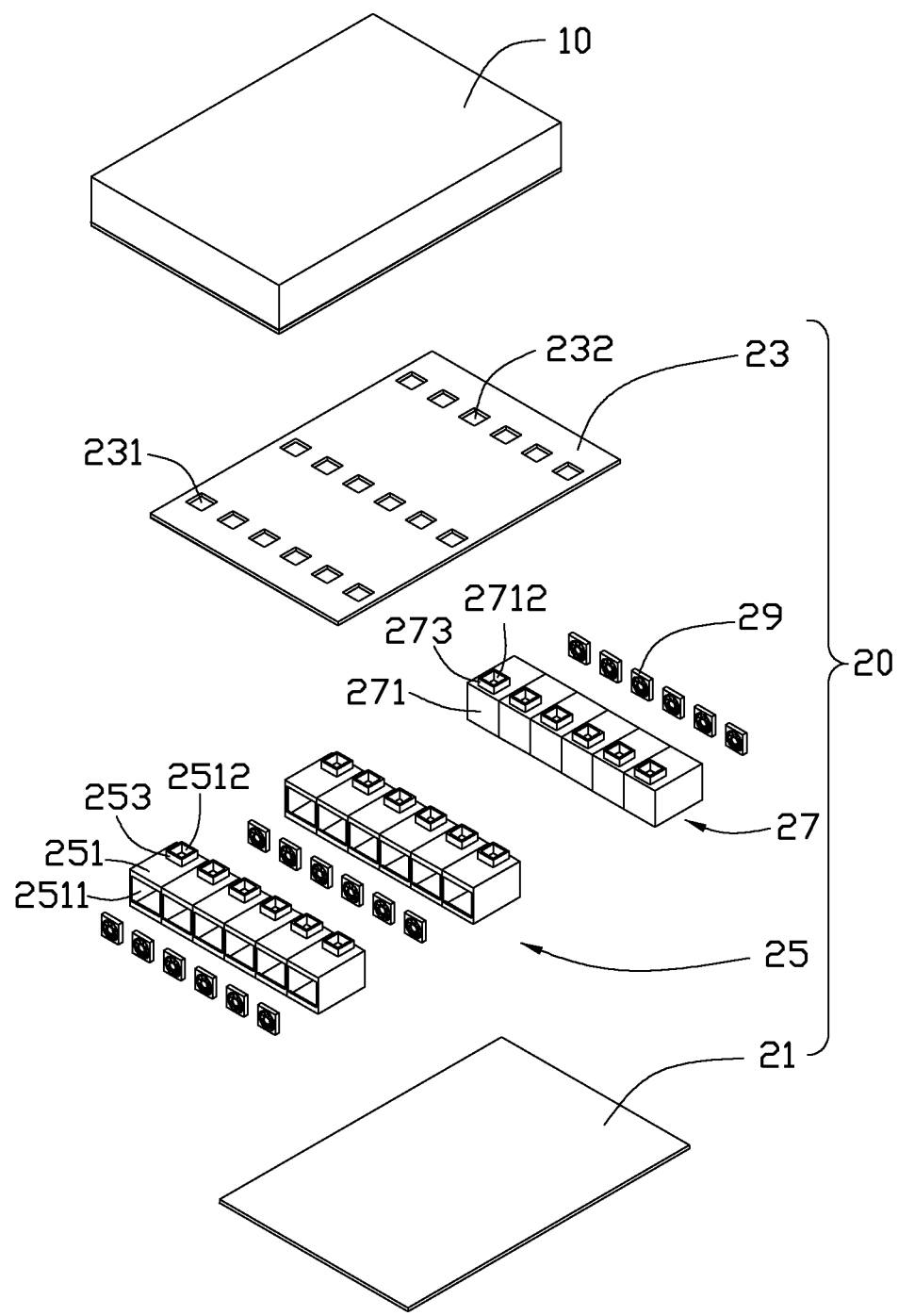

Referring to FIGS. 1 and 2, an exemplary embodiment of a server assembly includes a server 10 and a heat dissipation apparatus 20.

The server 10 includes a rectangular chassis 11, and a plurality of system fans 12 mounted in the chassis 11. The system fans 12 are adjacent to a front end of the chassis 11, and arranged in a row perpendicular to a front-to-rear direction of the chassis 11. A plurality of intakes 13 and a plurality of outlets 15 are defined in a top of the chassis 11. The intakes 13 are arranged in two parallel rows, respectively adjacent to front and rear sides the row of system fans 12. The outlets 15 are adjacent to a rear end of the chassis 11, and arranged in a row perpendicular to the front-to-rear direction of the chassis 11.

The heat dissipation apparatus 20 includes a plurality of first air ducts 25, a plurality of second air ducts 27, a plurality of air driving devices 29, a cover 21, and a bottom plate 23.

Each of the first air ducts 25 includes a hollow rectangular main body 251, and a connecting portion 253 protruding from a bottom of the main body 251. The first air duct 25 defines a first opening 2511 in an end of the main body 251, and a second opening 2512 in an end of the connecting portion 253 opposite to the main body 251. The first and second openings 2511 and 2512 both communicate with an inner space of the main body 251.

The second air ducts 27 are similar to the first air ducts 25. Each of the second air ducts 27 includes a hollow rectangular main body 271, and a connecting portion 273 protruding from a bottom of the main body 271. The second air duct 27 defines a first opening 2711 in an end of the main body 271, and a second opening 2712 in an end of the connecting portion 273 opposite to the main body 271. The first and second openings 2711 and 2712 both communicate with an inner space of the main body 271.

The bottom plate 23 defines a plurality of first connecting holes 231 arranged in two rows corresponding to the intakes 13, and a plurality of second connecting holes 232 arranged in a row corresponding to the outlets 15.

In one embodiment, the air driving devices 29 are fans. In other embodiments, the air driving devices 29 may be a plurality of air pumps.

In assembly of the heat dissipation apparatus 20, the air driving devices 29 are correspondingly mounted to the first openings 2511 of the first air ducts 25 and the first openings 2711 of the second air ducts 271. The connecting portions 253 of the first air ducts 25 extend through the corresponding first connecting holes 231 of the bottom plate 23, with the first opening 2511 of the first air ducts 25 directing forwards. The connecting portions 273 of the second air ducts 27 extend through the corresponding second connecting holes 232 of the bottom plate 23, with the first opening 2711 of the second air ducts 27 directing rearwards. The cover 21 is fixed to tops of the main bodies 251 and 271. Therefore, the main bodies 251 and 271 are sandwiched between the cover 21 and the bottom plate 23. In one embodiment, after assembly, the heat dissipation apparatus 20 is formed to be a rectangular module with a height equal to a standard height of servers, such as 1 unit (U) which is 1.75 inches.

Figure 3:
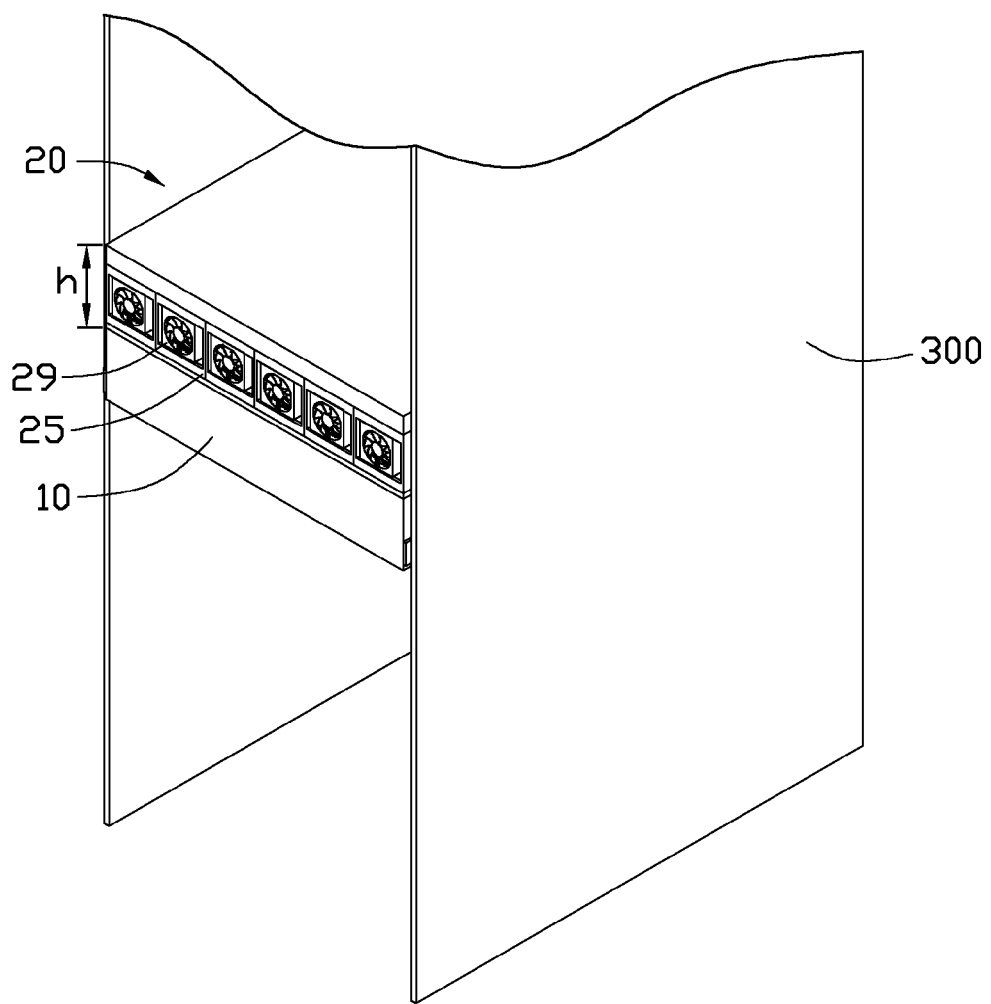
FIG. 3 is an assembled, isometric view of the server assembly of FIG. 1 and a server rack.

Referring to FIG. 3, to mount the heat dissipation apparatus 20 to the server 10, the connecting portions 253 of the first air ducts 25 are engaged in the corresponding intakes of the chassis 11, and the connecting portions 273 of the second air ducts 27 are engaged in the corresponding outlets 15. Therefore, the heat dissipation apparatus 20 is mounted to the top of the chassis 11. Since the heat dissipation apparatus 20 has a height equal to a standard height of servers, the heat dissipation apparatus 20 can be mounted in a standard server rack 300 together with the server 10.

In use, the air driving devices 29 mounted to the first air ducts 25 provide assistance for the system fans 12 to drive the air outside the chassis 11 into the first air ducts 25 through the first openings 2511, and expels the air out of the first air ducts 25 to flow into the chassis 11 through the second openings 2512. The system fans 12 further drive the air rearwards to flow through electronic devices (not shown) in the server, such as processors, memories, and chipsets, to cool the electronic devices. The air in the server is heated. The air driving devices 29 mounted to the second air ducts 27 provide assistance for the system fans 12 to drive the heated air to flow out the second air ducts 27 through the second openings 2712, and expel the heated air out of the second air ducts 27 through the first openings 2711.

It is understood that the first and second air ducts 25 and 27 increase the cooling capacity of the server 10, and the air driving devices 29 speed the airflow to further improve the cooling effectiveness. In other embodiments, the air driving devices 29 can be omitted to save cost.

What is claimed is:

1. A server assembly comprising:
   a server comprising a chassis and a plurality system fans received in chassis adjacent to a front end of the chassis, the chassis defining a plurality of intakes adjacent to the system fans, and a plurality of outlets to a rear end of the chassis;

a plurality of first air ducts each comprising a hollow first main body, and a first connecting portion protruding from a bottom of the first main body, to be engaged in a corresponding one of the intakes of the chassis; and a plurality of second air ducts each comprising a hollow second main body, and a second connecting portion protruding from a bottom of the second main body, to be engaged in a corresponding one of the outlets of the chassis;

wherein air outside the chassis flows through the first air ducts, thereby flowing into the chassis to cool the server to be heated, the heated air is then expelled out of the chassis through the second air ducts.

2. The server assembly of claim 1, wherein each of the first air ducts defines a first opening in an end of the first main body, and a second opening in the first connecting portion, the first and second openings communicate with an inner space of the first main body; each of the second air ducts defines a third opening in an end of the second main body, and a fourth opening in the second connecting portion, the third and fourth openings communicate with an inner space of the second main body.

3. The server assembly of claim 2, wherein the first openings of the first air ducts are directed forwards, and the third openings of the second air ducts are directed rearwards.

4. The server assembly of claim 1, wherein the system fans are arranged in a row perpendicular to a front-to-rear direction of the chassis; the intakes are arranged in two parallel rows perpendicular to the front-to-rear direction of the chassis, and respectively at front and rear sides the row of system fans; the outlets are arranged in a row perpendicular to the front-to-rear direction of the chassis.

5. The server assembly of claim 1, further comprising a cover and a bottom plate, wherein the bottom plate defines a plurality of first connecting holes to receive the first connecting portions of the corresponding first air ducts, and a plurality of second connecting holes to receive the second connecting portions of the corresponding second air ducts, the first and second main bodies are sandwiched between the cover and the bottom plate.

6. The server assembly of claim 5, wherein the cover, the bottom plate, the first air ducts, and the second air ducts are cooperatively formed a rectangular module with a height equaling to a standard height of servers.

7. The server assembly of claim 1, further comprising a plurality of air driving devices respectively mounted to the first openings of the first air ducts and the third openings of the second air ducts.

8. The server assembly of claim 7, wherein the air driving devices are fans or air pumps.

\* \* \* \* \*